United States Patent [19]

Hasegawa et al.

[11] Patent Number: 4,689,446
[45] Date of Patent: Aug. 25, 1987

[54] TOUCH-PANEL INPUT DEVICE

[75] Inventors: Kazuo Hasegawa; Hiroaki Sasaki; Kohji Nakase, all of Furukawa, Japan

[73] Assignee: Alps Electric Co., Ltd., Japan

[21] Appl. No.: 768,942

[22] Filed: Aug. 23, 1985

[30] Foreign Application Priority Data

Aug. 23, 1984 [JP] Japan .................................. 59-174152
Aug. 25, 1984 [JP] Japan .................................. 59-175864

[51] Int. Cl.$^4$ ............................................ G08C 21/00
[52] U.S. Cl. .................................... 178/18; 340/365 P
[58] Field of Search ............................. 178/18, 19, 20; 340/365 P, 365 E, 712, 709; 250/578

[56] References Cited

U.S. PATENT DOCUMENTS 4,459,476 7/1984 Weissmueller et al. .... 340/365 P X
4,517,559 5/1985 Deitch et al. ...................... 178/18 X Primary Examiner—Stafford D. Schreyer
Attorney, Agent, or Firm—Guy W. Shoup

[57] ABSTRACT

A touch-panel input device of the photoelectric system where a ray scans above a display face of a display unit. Respective coordinate values directed by bringing a finger tip onto the display face are detected by means of interrupted rays and displayed successively on the display face in the form of an index. The detected coordinate values are input into a processor unit when switching means is pushed by the finger tip.

5 Claims, 3 Drawing Figures

TOUCH-PANEL INPUT DEVICE

FIELD OF THE INVENTION

This invention relates to a touch-panel input device and, particularly, to a coordinate input device of the transparent touch-panel type which is mounted on the front of a display face and detects the coordinate position of a spot pushed by a finger tip, pen, etc.

BACKGROUND OF THE INVENTION

The transparent touch-panel type coordinate input device is attached to the front of the display face of a display device such as a CRT, LCD (liquid-crystal display), etc. and generates several controls in response to a simple push above the display face by an operator seeing the same. Thus, because it is adapted for simple input in so-called menue systems, there are advantages in employing it as an input device for the computer.

For the touch-panel input device there have been proposed several systems such as the resistance film system, capacity system, acoustic system utilizing surface elastic waves, and photoelectric system utilizing an optical beam. Among them, the photoelectric system utilizes photoelectric elements stored around the margin of the display face, so that there is little danger of a user coming into touch with the photoelectric elements, and there is no fear of an input panel receiving scratches or being damaged by adhesion of liquid because such an input panel does not exist on the front of the display face different from the other systems, and its operation reliability is high, accordingly, it is said that this photoelectric system has bright prospects for the future.

One such photoelectric system, uses a light emitting diode (hereinafter referred to as LED) as a light emitting element; a number of paired light emitting elements and light receiving elements are arranged for X, Y coordinates; and the light emitting elements of respective coordinates are driven in sequence one after another to scan over the display face by means of a ray. It has such advantages as that its cost is low as compared with a system employing a laser beam, and its lifetime is long because the photoelectric element is one of the solid-state parts.

However, the conventional touch-panel input device of the photoelectric system must continuously scan the display face by means of the ray at high speed, therefore, its consumption power is pulling up, a careless movement of a finger tip onto the display face causes an input corresponding to the spot where the finger tip approaches, further even a point on the display face on which an insect etc. is settling is also input, and, accordingly, misinputting can easily be caused by careless handling or unexpected events. Further, when the finger tip is trembling or fine coordinate values are to be directed, erroneous input occurs easily through inputting of adjacent coordinate values, thus, this frequently requires a direction-canceling operation and a retry. Furthermore, in case where the display device is a CRT, the display face is curved and this is apt to produce a parallax, whereby erroneous input would occur more frequently. Still more, in the case of successive inputting, the finger tip etc. having directed a first set of input coordinate values must be pulled away from the display face (from the plane being scanned by means of the ray) and then must be floated to re-enter at a next input coordinate spot while aiming at that spot, this is very different from the resistance film system etc. where the finger tip slides on the display face (sheet) without detaching therefrom and pushes a desired spot to achieve an input operation.

SUMMARY OF THE INVENTION

The present invention has been devised in view of the foreging drawbacks in the piror art, and its object is to provide a novel touch-panel input device of the type in that a scanning operation of a ray is achieved by driving light emitting elements in sequence, which is characterized in that the scanning operation is performed only when needed, thereby reducing power consumption, no erroneous input occur, and the input operation is easy and reliable.

In brief, in order to realize the foregoing object, a touch-panel input device of the photoelectric system type where a ray scans above a display face, has a transparent panel provided in front of the display face, a switching means which is actuated in response to pushing of the transparent panel, aiming means which display the latest coordinate values corresponding to the location of a finger tip, etc. above the display face by displaying an index on the display face, and waiting until triggered by a pushing operation against the switching means by the finger tip etc., before sending coordinates to a CPU so that they are first confirmed through intently watching that the index agrees with the desired input coordinates, whereby the desired coordinate values and are input into a processor unit.

DETAILED DESCRIPTION OF THE INVENTION

Figure 1:
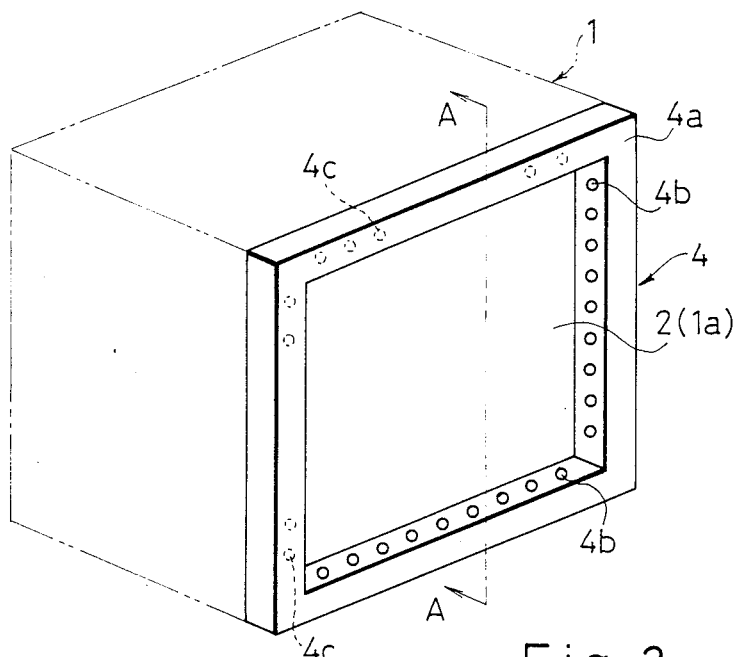
FIG. 1 is a schematic perspective view of an embodiment of the present invention.
Figure 2:
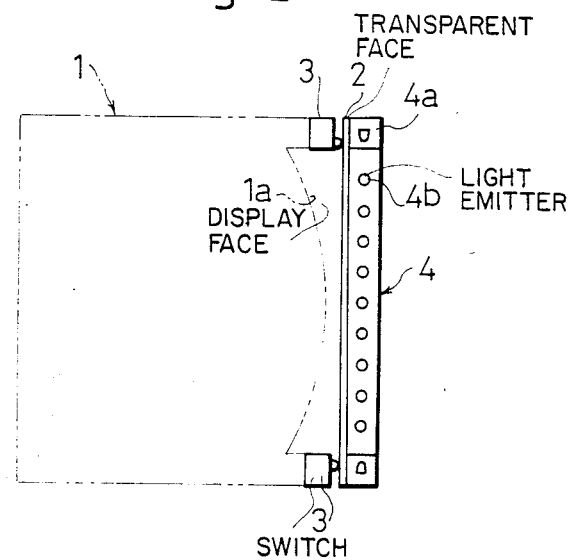
FIG. 2 is a sectional view taken along line A—A in FIG. 1.
Figure 3:
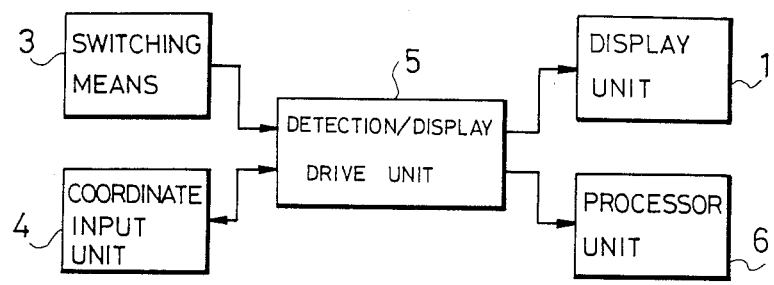
FIG. 3 is a block diagram of the embodiment.

An embodiment according to the present invention will be described with reference to the drawings illustrating the same.

In the drawings, 1 indicates a display unit, which is a CRT display having a curved display face 1a in the illustrated embodiment. The display unit may also be employed as LCD (liquid-crystal display), plasma display, EL (electroluminescence) display, ECD (electrochromic display), PLZT-utilized display (ceramic) or the like. A display unit for color display may also be selected. The display unit 1 is employed in a computer system for OA (office automation), CAD (computer aided design), personal use, etc. and can display symbol, area, pattern, index (cursor), etc. The display face 1a is substantially rectangular as viewed from the front, on the front of which a transparent panel 2 is provided that is a little wider than the display face 1a. The transparent panel 2 is made of synthetic resin, glass, etc. and endowed with eye-fatigue blocking characteristics to prevent reflection or flicker from occurring on the display face 1a, which function is realized by treating the face with a polarizing process, composing a mesh into the panel, or coloring the same. The transparent panel 2 is mounted on the display unit 1 by appropriate means so that is is movable (in response to pushing displacement) a certain extent toward the display face 1a.

3 indicates a push button switch (switching means) provided with click action. A desired number of these switches are arranged at positions in the vicinity of the outer margin of the display face 2a and opposite to the transparent panel 2, and turned on in response to pushing of the transparent panel 2. In the illustrated embodiment, four push button switches 3 are attached to four outer corners or four center portions of respective edges of the display face 2a. In modification, only one or two switches may be enough and, as switching means; a panel switch, capacitance switch, etc., may selectively be employed in place of the push button switches 3 included in the embodiment; but, the requirement is that the switching means must be turned on reliably when any portion of the transparent panel 2 is pushed.

4 indicates a coordinate input unit of the photoelectric system type, which is attached to the front of the display unit 1 with the transparent panel 2 interposed therebetween. The coordinate input unit 4 has a frame 4a corresponding to the external form of the display face 1a, on the mutually opposing sides of four sides of which a number of paired light emitting elements 4b composed of LEDs and light receiving elements 4c are arranged. By causing the light emitting elements 4b to emit light in sequence one after another from the end each of the X, Y coordinates, the ray scans above the display face 1a along the X, Y coordinates line by line. Power consumption may be reduced by scanning only after a first actuation of the switching means 3.

5 indicates a detection/display drive circuit or unit, which detects the position where each of the X, Y coordinates rays are interrupted (the position of the light receiving element 4c at which no ray arrives from the light emitting element 4b) by positioning the finger tip etc. above the display face 1a (the transparent panel 2) where the ray is scanning as described hereinabove, applies always the latest-detected coordinate values to an internal buffer circuit to renew its contents, and supplies the latest-detected coordinate values to the display unit 1, whereby the display unit 1 displays the latest-detected coordinate values in the form of a desired index (cursor) such as a blinking mark at a position on the display face 1a corresponding to the ray-interrupted position. At the time the coordinate value of each of the X, Y coordinates is detected, the detection/display circuit 5 stops the scanning operation of each coordinate direction for a desired time (for instance, from ten to some hundreds of msec), and, after this desired time of scanning suspension has elapsed, the coordinate input unit 4 starts again a high-speed scanning operation (for instance, of the rate of about 10 msec per one scanning) automatically. The intermittent scanning saves power and avoids spurious input.

Also, the detection/display drive circuit 5 generates a rising signal at the switch-on time of the push button switch (switching means) 3. In response to incoming of this rising signal the detection/display drive circuit 5 causes the internal buffer to supply the latest-detected coordinate values stored presently in this buffer (the coordinate values presently displayed in the form of an index on the display face 1a) to a processor unit 6 of a computer etc.

Now, the operation of the foregoing present embodiment will be described. As a directing member such as the finger tip, pen, etc. (hereinafter named collectively the finger tip) is positioned above the display face 1a (sliding on transparent panel 2), the detection/display drive circuit 5 detects the position of the finger tip at a desired interval, in response thereto the display unit 1 displays the corresponding coordinate position in the form of the index. Therefore, while comparing the picture on the display face 1a with the position of the index the operator slides his finger tip and moves the index to an objective position and, at the time the index is observed as having reached the desired position, pushes the transparent panel 2. In response to this pushing the push button switch 3 turns on, whereby the desired coordinate values are input into the processor unit 6. In response to receiving of that values the processor unit 6 performs a certain process, and the results are presented on the display face 1a. In the case of continuous inputting, repetition of sliding and pushing by the finger tip causes the coodinate values to be input successively, surely and simply, as described hereinabove. In case the push button switch 3 has the sense of click as the embodiment does, the reliability of operation is enhanced more.

As apparent from the foregoing description, the touch-panel input device of the photoelectric system having intrinsically the several merits has been improved more in accordance with the present invention in that on the display face the latest coordinate values detected or directed by the directing member such as the finger tip are displayed and, upon confirming the indication, the input operation is completed through pushing by the finger tip etc. Thus, the present invention produces the effects that no erroneous input occurs unlike the conventional device, fine and continuous input of the coordinate positions is achieved surely and easily, and the consumption power is remarkably reduced because the scanning operation is performed only when needed.

While the preferred embodiment has been described, variations thereto will occur to those skilled in the art within the scope of the present inventive concepts which are delineated by the following claims.

What is claimed is:

1. A touch-panel input device of the type having:

a coordinate input unit having a plurality of paired light emitting elements and light receiving elements arranged on mutually opposing sides of four sides of a display face, means for performing a scanning operation in an input field of said coordinate input unit in front of said display face by causing said light emitting elements to emit light in sequence one after another along X,Y coordinate directions, and means for detecting a coordinate position where a pointing object causes an interruption of a light beam from a light emitting element to a light receiving element of said coordinate input unit and displaying the detected position by an index on the display face, characterized by the improvement comprising:

a transparent panel provided in front of said display face and positioned in correspondence with the input field of said coordinate input unit;

a processor unit for storing coordinate values of a desired input position of the pointing object in the input field of said coordinate input unit; and switching means connected to a portion of said transparent panel and to said processor unit, said switching means being actuated in response to a desired input position on said transparent panel being pushed by the pointing object interposed in the input field of said coordinate input unit, wherein the coordinate values of the desired input position of said pointing object is stored in said processor unit when said switching means is actuated.

2. A touch-panel input device as set forth in claim 1, wherein said detected coordinate position is displayed successively in the form of an index on said display face one at a time.

3. A touch-panel input device as set forth in claim 1, wherein said transparent panel is an eye-fatigue blocking panel.

4. A touch-panel input device as set forth in claim 1, wherein said switching means has the sense of click.

5. A touch-panel input device as set forth in claim 1, wherein said scanning operation is interrupted intermittently and, thereafter, started automatically.

* * * * *